United States Patent
Multner et al.

(10) Patent No.: US 10,661,249 B2
(45) Date of Patent: May 26, 2020

(54) STIRRING DEVICE

(71) Applicant: EKATO Ruehr- und Mischtechnik GmbH, Schopfheim (DE)

(72) Inventors: Benjamin Multner, Wehr (DE); Christian Berner, Weil am Rhein (DE); Marco König, Schopfheim (DE)

(73) Assignee: EKATO Rühr- und Mischtechnik GmbH, Schopfheim (DE)

( * ) Notice: Subject to any disclaimer, the term of this patent is extended or adjusted under 35 U.S.C. 154(b) by 0 days.

(21) Appl. No.: 16/480,827

(22) PCT Filed: Jan. 10, 2018

(86) PCT No.: PCT/EP2018/050546
§ 371 (c)(1),
(2) Date: Jul. 25, 2019

(87) PCT Pub. No.: WO2018/141517
PCT Pub. Date: Aug. 9, 2018

(65) Prior Publication Data
US 2019/0388866 A1    Dec. 26, 2019

(30) Foreign Application Priority Data

Feb. 3, 2017    (DE) .................. 10 2017 102 165

(51) Int. Cl.
*B01J 19/12*    (2006.01)
*B01F 7/16*    (2006.01)
(Continued)

(52) U.S. Cl.
CPC ........... *B01J 19/18* (2013.01); *B01F 7/00633* (2013.01); *B01F 7/168* (2013.01);
(Continued)

(58) Field of Classification Search
None
See application file for complete search history.

(56) References Cited

U.S. PATENT DOCUMENTS 3,567,921 A * 3/1971 Holiday ................. B01J 19/123
250/428
4,377,459 A * 3/1983 Parker ...................... B01J 8/08
525/239
(Continued)

FOREIGN PATENT DOCUMENTS

CN    202803248 U    3/2013
DE    8112538 U1    10/1981
(Continued)

OTHER PUBLICATIONS

Machine translation for JP 59-059246 A. Retrieved from J-PlatPat website on Oct. 24, 2019. (Year: 2019).*
(Continued)

*Primary Examiner* — Jennifer A Leung
(74) *Attorney, Agent, or Firm* — Posz Law Group, PLC

(57) ABSTRACT

A stirring device, in particular reactor stirring device, has at least one holder which is configured for holding at least one brittle unit within a container relative to at least one container wall of the container, and which has at least one holding unit for this purpose. At least one holding position of the holder relative to the container wall can be adapted by means of the holding unit.

11 Claims, 4 Drawing Sheets

(51) Int. Cl.
- *B01F 15/06* (2006.01)
- *B01J 19/18* (2006.01)
- *B01F 7/00* (2006.01)
- *B01J 19/00* (2006.01)
- *B01F 13/00* (2006.01)

(52) U.S. Cl.
CPC ........ *B01F 13/0006* (2013.01); *B01F 15/067* (2013.01); *B01J 19/0066* (2013.01); *B01J 19/123* (2013.01); *B01J 2219/00144* (2013.01); *B01J 2219/00779* (2013.01)

(56) References Cited

U.S. PATENT DOCUMENTS

| | | |
|---|---|---|
| 2007/0025889 A1 | 2/2007 | Boggs et al. |
| 2008/0203321 A1 | 8/2008 | Betz |

FOREIGN PATENT DOCUMENTS

| | | | | |
|---|---|---|---|---|
| GB | 663283 | | 12/1951 | |
| GB | 1136116 A | * | 12/1968 | ............ B01F 15/066 |
| JP | 56118732 A | * | 9/1981 | ............ B01J 19/123 |
| JP | 59059246 A | * | 4/1984 | ............ B01J 19/123 |
| WO | 93/15830 A1 | | 8/1993 | |
| WO | 2007/057082 A1 | | 5/2007 | |
| WO | 2010/055288 A1 | | 5/2010 | |

OTHER PUBLICATIONS

Machine translation for JP 56-118732 A. Retrieved from J-PlatPat website on Oct. 24, 2019. (Year: 2019).*

Office Action dated Sep. 19, 2017 issued in corresponding DE patent application No. 10 2017 102 165.5 (and English translation).

International Search Report and Written Opinion of the International Searching Authority dated Apr. 24, 2018 issued in corresponding International Patent Application No. PCT/EP2018/050546.

International Preliminary Report on Patentability of the International Searching Authority dated Aug. 6, 2019 issued in corresponding International Patent Application No. PCT/EP2018/050546.

* cited by examiner

US 10,661,249 B2

STIRRING DEVICE

CROSS REFERENCE TO RELATED APPLICATIONS

This application is a U.S. national stage application of PCT/EP2018/050546 filed on Jan. 10, 2018, which is based on German Patent Application No. 10 2017 102 165.5 filed on Feb. 3, 2017, the contents of which are incorporated herein by reference.

PRIOR ART

The invention relates to a stirring device and to a method.
It is known from polymer chemistry to chlorinate polyvinyl chloride by irradiation with UV light in a stirring vessel. Use is made for this purpose of a UV lamp which is surrounded by a brittle housing, in particular of quartz glass, wherein the housing is therefore susceptible to damage by means of a stirring agitator of the stirring vessel, in particular due to vibrations, shearing forces, corrosions and/or distortions to a holder occurring because of mounting and/or production tolerances. For this purpose, the housing is conventionally kept relatively short and is preferably fastened merely at two points within a container of the stirring vessel.

The object of the invention is in particular to obtain improved properties in respect of reliability.

Advantages of the Invention

The invention is based on a stirring device, in particular a reactor stirring device, having a holder which is configured for holding a brittle unit composed in particular of glass, preferably of quartz glass in particular a radiation unit, within a container relative to a container wall of the container comprising a holding unit for this purpose.

It is proposed that at least one holding position of the holder relative to the container wall can be adapted by means of the holding unit.

Reliability can be improved by means of this implementation. Advantageously, safety, in particular mounting safety, can be improved since in particular production and/or mounting tolerances can be compensated for by adaptation of the holding position. Furthermore, operating safety can advantageously be improved since damage due to a stirring agitator, in particular due to vibrations and/or shearing forces caused by the stirring agitator and acting on the brittle unit, can be reduced. Furthermore, in particular an advantageously compact design can be obtained, and therefore vibrations and/or shearing forces acting on the brittle unit can be reduced and/or uniformally dissipated. The service life can be particularly advantageously increased. Furthermore, in particular, exchange and/or cleaning of worn parts can be simplified.

A "stirring device" is intended to be understood as meaning in particular a device which preferably comprises at least one stirring agitator and which is preferably configured for processing, in particular at least for homogenizing, suspending, emulsifying and/or gassing at least one medium and/or for heat transfer within at least one medium. In particular, the stirring device is at least part of a stirring vessel and/or a stirring installation and/or an in particular stirred reactor. The stirring device can advantageously include the entire stirring vessel and/or the entire stirring plant. The stirring device is preferably configured for processing and/or producing a medium containing at least one synthetic material, preferably polyvinyl chloride. Furthermore, the medium can comprise in particular further components, such as, for example, solvents, stabilizers, dyes and/or further synthetic materials. A "reactor stirring device" is intended to be understood as meaning in particular a stirring device which, for the processing of the medium, is configured at least for initiating and/or maintaining a chemical reaction of the medium, such as, for example, polymerization and/or halogenation, in particular chlorination. The reactor device is preferably a photoreactor device. "Configured" is intended to be understood as meaning in particular specially programmed, designed and/or equipped. The fact that an object is configured for a certain function is in particular to mean that the object fulfils and/or carries out this certain function in at least one application state and/or operating state.

The stirring device can in particular comprise the container. The container is in particular implemented rotationally symmetrically and preferably at least substantially cylindrically. A container wall in particular forms a cylinder surface of the container. The container has in particular a preferably curved cover and/or bottom which are/is connected to the container wall. The cover and/or the bottom can be connected, in particular integrally, to the container wall. "Integrally" is in particular to mean connected at least by substance-to-substance bond, for example by a welding process, an adhesive bonding process, an injection-molding process and/or another process deemed expedient by a person skilled in the art, and/or is advantageously to mean shaped in one piece, such as, for example, by production from a casting and/or by production in a single- or multi-component injection-molding method and advantageously from an individual blank. Alternatively, the cover and/or the bottom can be connected to the container wall in a force-fit and/or form-fit manner. "A force-fit and/or form-fit connection" is in particular to be understood here as a releasable connection, wherein a holding force is transmitted between two components preferably by a geometrical engagement of the components in each other and/or by a frictional force between the components. In particular for mounting of the brittle unit and preferably for making contact, such as, for example, for power supply, the container, in particular the cover and/or the base, has at least one receiving recess at least for the brittle unit, in particular the radiation unit, wherein the receiving recess is preferably closable by means of a flange.

The stirring device can in particular comprise at least the brittle unit. In this connection, a "brittle" unit is intended to be understood as meaning in particular a unit which can be elastically deformed by external action force and can be destroyed by the latter before the unit can be permanently plastically deformed. In particular in the event of a deviation of a substantially linear profile of a stress/deformation characteristic of the brittle unit, the latter is destroyed. The brittle unit can be destroyed in particular by a deformation by at most 10%, preferably by at most 5% and particularly preferably by at most 1%. Furthermore, "brittle" is intended to be understood in particular as also meaning fragile and/or breakable. The brittle unit is in particular part of the radiation unit which preferably comprises a radiation source, in particular a UV lamp, which is configured for subjecting the medium to electromagnetic radiation, in particular to UV radiation, and which is in particular configured for at least initiating and/or maintaining at least one chemical reaction of at least one medium. The radiation source can have, for example, a lamp, an LED and/or a laser. The brittle unit forms a housing for protecting the radiation source. The radiation source is surrounded in particular at least partially, preferably at least for a large part and particularly preferably completely at least in a circumferential direction by the brittle unit, in particular the housing. The housing is composed in particular at least partially, preferably at least for a large part and particularly preferably completely of a material which is at least translucent and/or is preferably transparent for the radiation of the radiation source. The expression "at least for a large part" is intended to be understood here as meaning in particular at least up to 55%, advantageously at least up to 65%, preferably at least up to 75%, particularly preferably at least up to 85% and particularly advantageously at least up to 95%. The housing is designed in particular as a glass tube, in particular as a quartz glass tube. The brittle unit is in particular of elongate design. In this connection, an "elongate object" is intended to be understood as meaning in particular an object, the main extent of which is at least 10 times, preferably at least 25 times, preferentially at least 35 times and particularly preferably at least 45 times the size of an extent of the object perpendicular to the main extent thereof and/or in particular to the diameter thereof. The main extent of the brittle unit preferably corresponds at least to 50%, preferably at least 75% and particularly preferably at least 90% of the main extent of the container. A "main extent" of an object is intended to be understood here as meaning in particular a longest edge of a smallest imaginary cuboid which just still completely surrounds the object.

In this connection, a "holding position" is intended to be understood as meaning in particular a position in which the holder is configured to hold the brittle unit in a mounted state. In particular, the holding position is an intersecting plane of the axis of gravity of the brittle unit and a main plane of extent of the holding unit of the holder. A main extent of a brittle unit held in the holding position is in particular at least substantially parallel to the container wall. "At least substantially parallel" is intended to be understood here as meaning in particular an orientation of a direction relative to a reference direction, in particular a plane, wherein the direction has a deviation in relation to the reference direction in particular of smaller than 8°, advantageously of smaller than 5° and particularly advantageously of smaller than 2°. The holding unit is in particular configured to hold the brittle unit on a section which is different from free ends of the brittle unit. "Can be adapted" is in particular to mean variable and/or capable of compensating at least for production and mounting tolerances or else erroneous positioning.

The holding unit has a carrier unit, which is configured for at least partially receiving a weight force and/or a transverse force of the brittle unit, and which is connected in at least one mounted state to the container wall. The carrier unit is preferably connected to the container wall by substance-to-substance bond. "Connected by substance-to-substance bond" is to be understood in particular as meaning that the mass parts are held together by atomic or molecular forces, such as, for example, during soldering, welding, adhesive bonding and/or vulcanizing. Alternatively or additionally, the carrier unit can be connected to the container wall in a force-fit and/or form-fit manner. The carrier unit has in particular at least one holding recess for receiving the brittle unit. The carrier unit has in particular at least one connecting foot, preferably at least two connecting feet, by means of which the carrier unit is supported on the container wall and which is/are configured for connection of the carrier unit to the container wall. The carrier unit is composed in particular of a corrosion-resistant material, such as, for example, a metal, in particular titanium. By this means, stability of the connection of the holding unit to the container can advantageously be improved. In particular, a contact surface between the container wall and carrier unit can be increased, as a result of which a weight force and/or transverse force and in particular vibrations and/or shearing forces can be transmitted uniformly to the container wall.

The holding unit has a connection unit which is configured for at least partially, in particular at least for a large part and particularly preferably completely, engaging around the brittle unit in the circumferential direction and for connecting the brittle unit to the container wall, in particular to the carrier unit. In particular, the connection unit engages around the brittle unit from at least two mutually opposite sides. In particular, the connection unit is configured for connecting the brittle unit to the container wall, in particular to the carrier unit, in a force-fit and/or form-fit manner, specifically preferably via a frictional connection to the brittle unit. Alternatively or additionally, a substance-to-substance bond is also conceivable. By this means, the brittle unit can be connected to the container wall, in particular to the carrier unit, in particular in a simple manner. Furthermore advantageously, the brittle unit can be held in a particularly material-protective manner.

In order in particular to simplify mounting, it is furthermore proposed that the connection unit is supported movably relative to the carrier unit in at least one preassembled state. In particular, the connection unit is supported movably at least in a plane which is at least substantially perpendicular to the container wall and is preferably supported immovably at least in a direction at least substantially parallel to the container wall. A "preassembled state" is intended to be understood as meaning in particular a state in which components are connected movably to one another, by are not yet in their final position in which they are in particular fixedly connected to one another.

The connection unit has a guide element for movably supporting the connection unit relative to the carrier unit. The guide element is composed in particular of a corrosion-resistant material, such as, for example, a metal, in particular titanium. By this means, an advantageous mounting of the connection unit can be achieved. Furthermore, the holding position can be precisely adjusted by means of the guide element.

The connection unit has a further guide element and the carrier unit is, in at least one mounted state, clamped between the guide element and the further guide element preferably in the direction of the container wall. The guide element and the further guide element are connected to each other by means of a screw connection, as a result of which in particular the carrier unit is clamped between the guide element and the further guide element. Stability of the mounting can therefore be improved. In particular, the guide elements can be exchanged and/or cleaned in a simple manner.

Furthermore, it is proposed that the connection unit has a contact element which is configured to provide a contact surface for making contact at least with the brittle unit, in particular the radiation unit. The contact element is designed in particular, as a preferably annular jaw. The contact element is configured in particular for a frictional connection at least to the brittle unit, in particular the radiation unit. The contact unit is composed at least partially, preferably at least for a large part and particularly preferably completely of a synthetic material, in particular an acid-resistant plastic, which is preferably also resistant to aggressive acids, such as, for example, aqua regia. The synthetic material is particularly preferably polytetrafluoroethylene (PTFE), in particular also known under the tradename Teflon. By this means, a particularly material-protecting connection of the brittle unit to the carrier unit can be achieved. In particular, vibrations and/or shearing forces can be damped.

In a particularly preferred implementation of the invention, it is proposed that the contact surface has a shape that is at least substantially adapted to at least one surface at least of the brittle unit, in particular the radiation unit. In particular, the contact surface corresponds at least substantially to a negative of the surface of the brittle unit, in particular the housing of the brittle unit. A frictional connection can thereby be further improved.

It is conceivable for the guide element and the contact element to be embodied integrally and/or to be connected to each other by substance-to-substance bond. To improve exchangeability of wear parts, it is proposed that the guide element is connected to the contact element at least in a form-fit manner. Alternatively or additionally, the guide element can be connected to the contact element in a force-fit manner. Furthermore, it is proposed, in a preferred implementation of the invention, that the contact element is clipped in the guide element. The contact element can thereby be connected to the guide element in a simple manner.

It is furthermore proposed that the connection unit is fixedly connected to the carrier unit in at least one mounted state. In particular, the holding unit can have a connecting unit which is configured for force-fit and/or form-fit connection of the connection unit to the carrier unit. In particular, the connection unit can be connected in a force-fit and/or form-fit manner to the carrier unit, such as, for example, via a screw connection. By this means, in particular, stability of the holder can be improved.

Furthermore, it is proposed that the holding unit has at least one securing unit which, in the mounted state, secures the connection of the carrier unit to the connection unit. The securing element is in particular configured for locking the connecting unit in a state in which the latter connects the connection unit to the carrier unit. The securing unit comprises at least one securing element which is configured to prevent, by a form-fit connection, a release of the connection of the carrier unit and the connection unit. In particular, the securing element is designed as a bending part which can be clamped in particular when the connection unit is connected to the carrier unit, and can be bent at least once without destruction in order to realized a form-fit connection therewith. This makes it possible to avoid the connection of the connection unit to the carrier unit being released by vibrations and/or shearing forces during operation.

It is furthermore proposed that the stirring device has at least the brittle unit, in particular the radiation unit, which is at least partially composed of glass, in particular quartz glass. In particular, at least the brittle unit, in particular the radiation unit, is at least partially composed of glass. In particular, the housing has at least one glass protective tube. The glass protective tube can be realized in particular from a material different from glass. By this means, corrosion resistance of the brittle unit can be achieved.

Furthermore, it is proposed that the holder has at least one further holding unit, in particular at least two and preferably a plurality of further holding units, which is/are arranged offset with respect to the holding unit as viewed along the container wall, in particular as viewed along the main extent of the container wall and/or the brittle unit. The further holding unit is preferably embodied at least substantially identically to the holding unit. In particular, the further holding units can define the holding position, wherein at least the holding unit is configured for adaptation of the holder preferably to a position of the brittle unit. By this means, in particular stability of the holder can be further improved. In particular, a weight force and/or a transverse force and in particular forces acting on the brittle unit from the outside can be distributed uniformly. Furthermore, vibration behavior can be further reduced by damping behavior and/or a resonant frequency of the holder being able to be varied by an additional weight of the further holding unit.

In a further aspect of the invention, a method for mounting a brittle unit within a container by means of a holder is proposed, comprising compensating tolerances by means of at least one holding unit of the holder. This implementation makes it possible to improve reliability.

The stirring device is not intended to be restricted here to the above-described use and embodiment. In particular, the stirring device, in order to perform a function described herein, can have a number of individual elements, components and units differing from a number stated herein.

DRAWINGS

Further advantages will emerge from the description below of the drawings. The drawings illustrate an exemplary embodiment of the invention. The drawings, the description and the claims contain numerous features in combination. A person skilled in the art will purposefully also consider the features individually and will find further expedient combinations.

DESCRIPTION OF THE EXEMPLARY EMBODIMENTS

Figure 1:
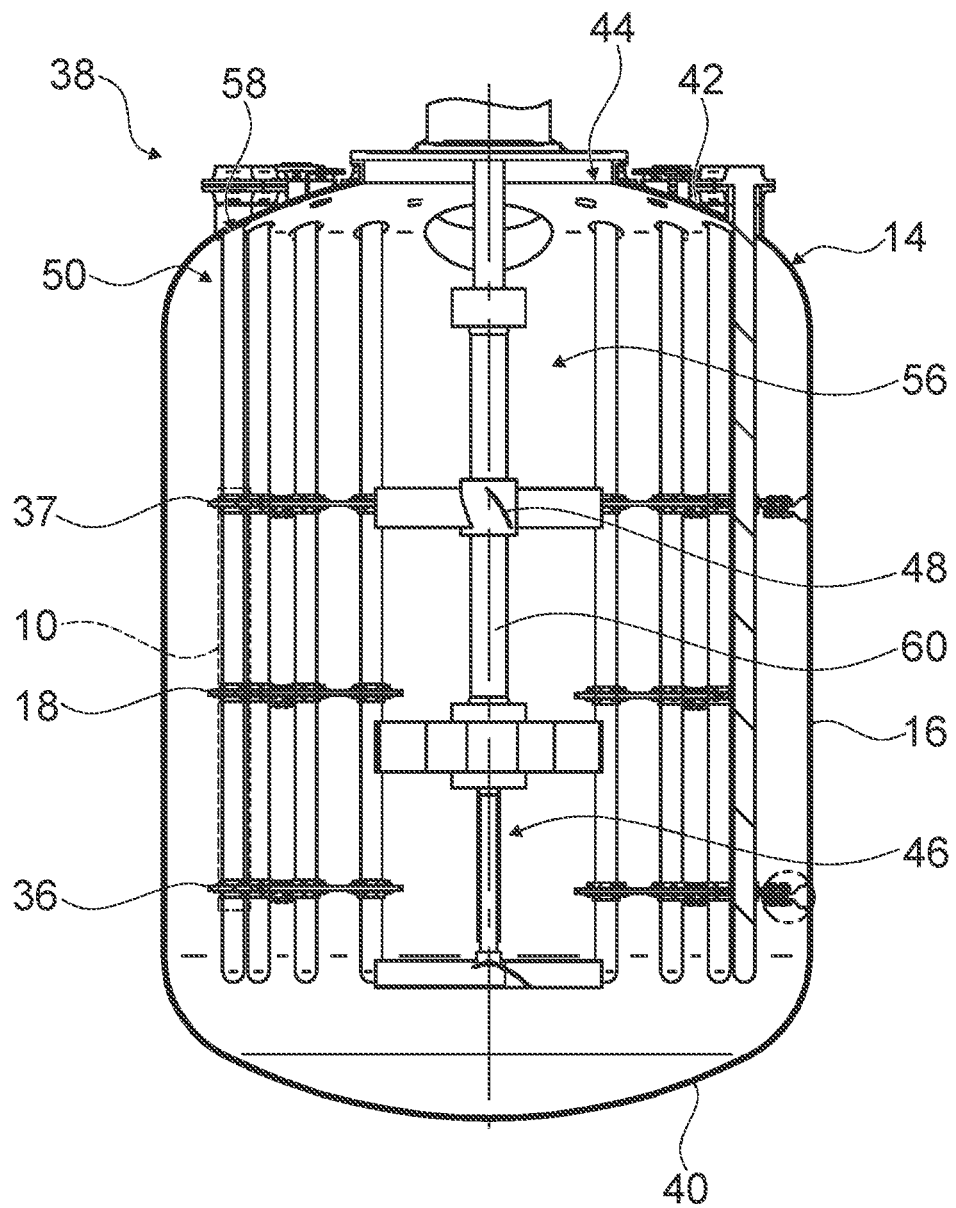
FIG. 1 shows a stirring vessel having a stirring device in a sectional view.

FIG. 1 shows a stirring vessel 38 having a stirring device in a perspective illustration. In the present case, the stirring device is designed as a reactor stirring device.

The stirring device has at least one container 14. The container 14 has a container wall 16. Furthermore, the container 14 has a bottom 40. The bottom 40 is connected integrally to the container wall 16. Furthermore, the container 14 has a cover 42. The cover 42 is connected integrally to the container wall 16. The cover 42 has an opening 44. The opening 44 is closeable. For example, the opening 44 can be closed by means of a flange. The opening 44 can be configured for filling the container 14 with a medium 56. Furthermore, the opening 44 can be configured for the introduction of a stirring agitator 46 of the stirring device.

The stirring device is configured for a processing of a medium 56. In the present case, the medium 56 contains at least one synthetic material. The synthetic material is polyvinyl chloride. The stirring device is configured for chlorination of the medium 56.

The stirring agitator 46 is configured for a processing of the medium 56. The stirring agitator 46 has at least one stirring element 48. In the present, the stirring agitator 46 has three stirring elements 48. For better clarity, only one stirring element 48 is provided with a reference sign in the drawings. It is conceivable for the stirring agitator 46 to be able to have a number of stirring elements 48 differing from the number shown here, said stirring elements being able to be embodied in particular identically to or different from one another. The stirring agitator 46 has a shaft 60 on which the stirring element 48 is supported for rotation therewith. It is conceivable for the stirring agitator 46 to have at least two or more shafts 60 for the mounting of stirring elements 48 for rotation therewith.

Figure 2:
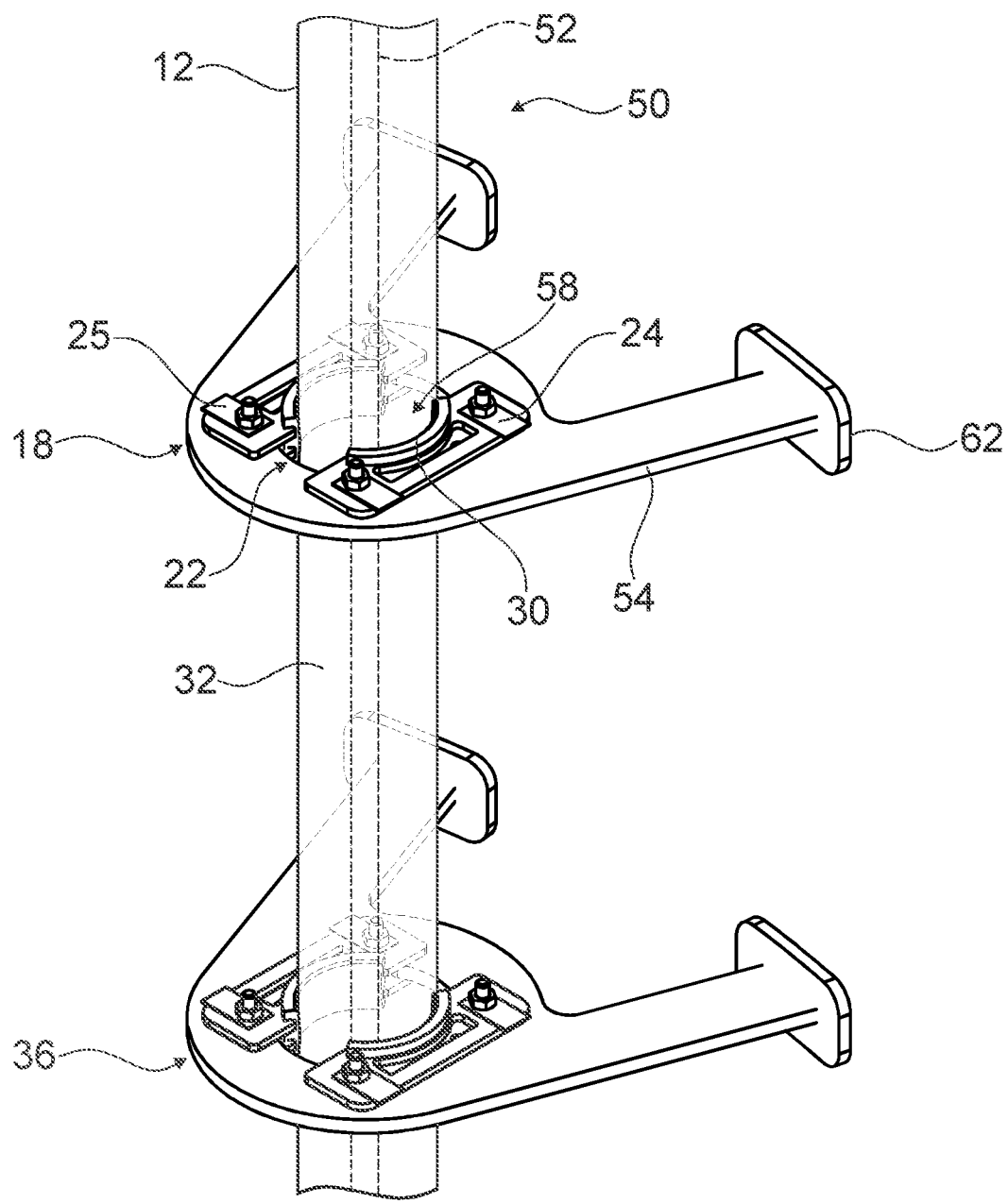
FIG. 2 shows part of the stirring device having a holder in a perspective view.

The stirring device has at least one radiation unit 50 (cf. FIG. 2). In the present case, the stirring device has sixteen radiation units 50. For better clarity, only one radiation unit 50 is provided with a reference sign in the drawings. Furthermore, only the radiation unit 50 is described in more detail below. The description can be directly transferred to further radiation units 50.

The radiation unit 50 is configured for processing the medium 56. The radiation unit 50 is of elongate design. The radiation unit 50 is configured for at least initiating and/or maintaining at least one chemical reaction, in particular chlorination, of the medium 56. The radiation unit 50 has a radiation source 52. The radiation source 52 is of elongate design. The radiation source 52 is configured for subjecting the medium 56 to electromagnetic radiation, in particular to UV radiation. The radiation source 52 can be designed, for example, as a UV lamp, as a UV LED and/or as a UV laser.

The radiation unit 50 has a brittle unit 12. The brittle unit 12 forms a housing for protecting the radiation source 52. The radiation source 52 is surrounded in particular at least partially, preferably at least for a large part and particularly preferably completely at least in a circumferential direction by the brittle unit 12. The brittle unit 12 is at least partially composed of a material which is at least translucent for the radiation of the radiation source 52, in particular glass and/or quartz glass. The brittle unit 12 is of elongate design. The brittle unit 12 at least partially implements the radiation unit 50. The brittle unit 12 forms a glass tube, in particular a quartz glass tube. A main extent of the brittle unit 12 is at least fifteen times as large as the diameter thereof. The main extent of the brittle unit 12 preferably corresponds to at least 75% of the main extent of the container 14.

For mounting at least of the brittle unit 12 and in particular the radiation unit 50, and preferably for making contact, such as, for example, for supplying power to the radiation source 52, the container 14 has a receiving recess 58. The receiving recess 58 is arranged in the region of the cover 42. The receiving recess 58 is closable by means of a flange.

The stirring device has at least one holder 10 (cf. FIG. 1). The holder 10 is configured for holding at least the brittle unit 12, in particular the radiation unit 50, within the container 14 relative to the at least one container wall 16 of the container 14. The stirring device has a holder 10 per brittle unit 12. The holders 10 are embodied identically to one another. For better clarity, only one holder 10 is provided with a reference sign in the drawings. Only one holder 10 is described in more detail in the description below. The description can be directly transferred to further holders 10. The holders 10 are arranged offset with respect to one another in a circumferential direction of the container wall 16. The holders 10 are in particular arranged rotationally symmetrically with respect to one another.

The holder 10 has at least one holding unit 18 (cf. FIG. 2). In the present case, the holder 10 has a holding unit 18. Furthermore, the holder 10 has two further holding units 36, 37. The holding unit 18 and the further holding units 36, 37 are embodied identically to one another.

The holding unit 18 and the further holding units 36, 37 are arranged offset with respect to one another, in particular under one another, along the container wall 16, in particular along the main extent of the container wall 16. The further holding units 36, 37 define a holding position of the holder 10. The holding position of the holder 10 relative to the container wall 16 can be adapted at least by the holding unit 18. Furthermore, it is conceivable that the holding position can also be adapted by means of the further holding units 36, 37. Only the holding unit 18 is described in more detail in the description below. The description can be directly transferred to the further holding units 36, 37.

The holding unit 18 holds at least the brittle unit 12, in particular the radiation unit 50, in a region different from an open end of the brittle unit 12, in particular of the radiation unit 50.

Figure 3:
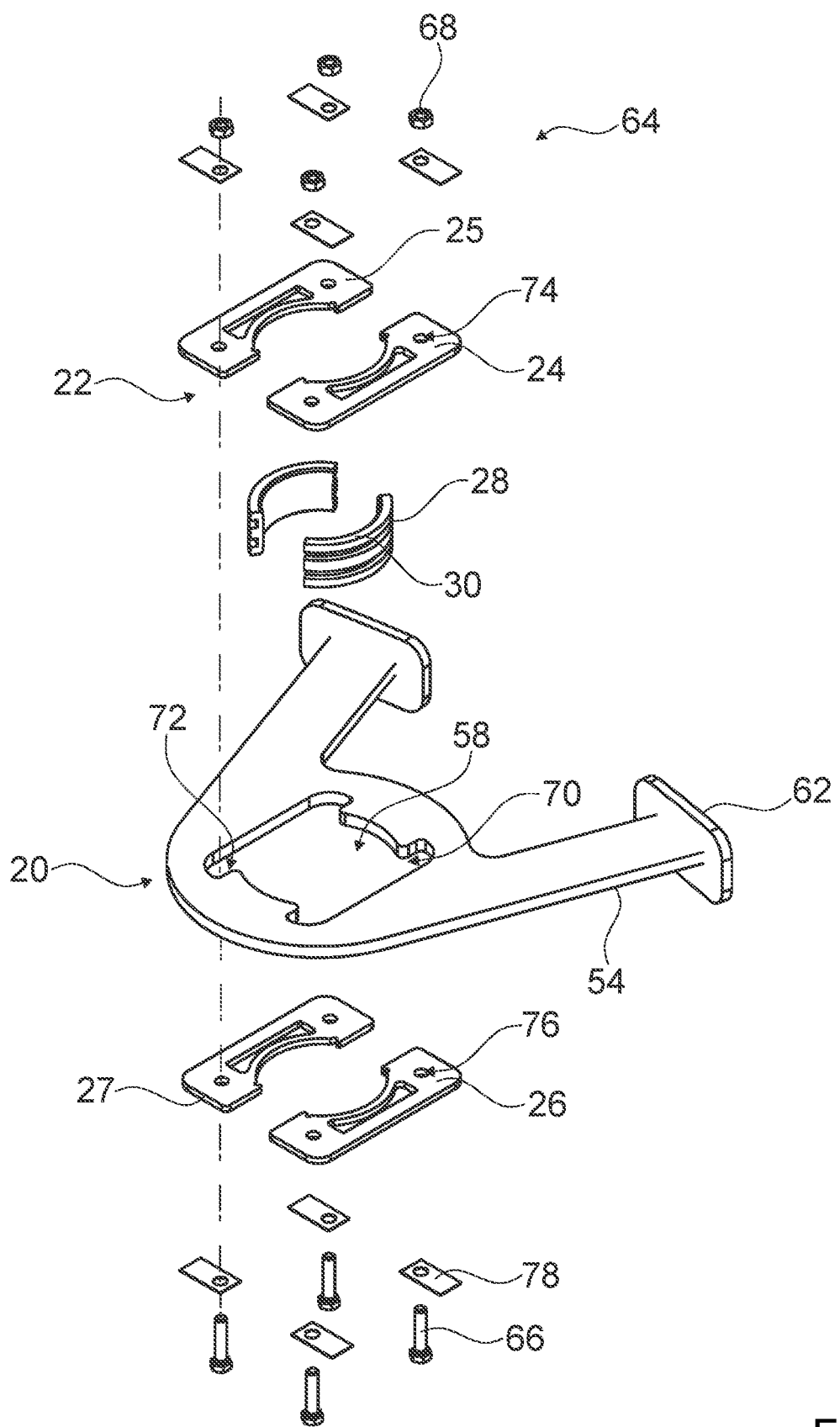
FIG. 3 shows part of the stirring device having the holder in an exploded illustration.
Figure 4A:
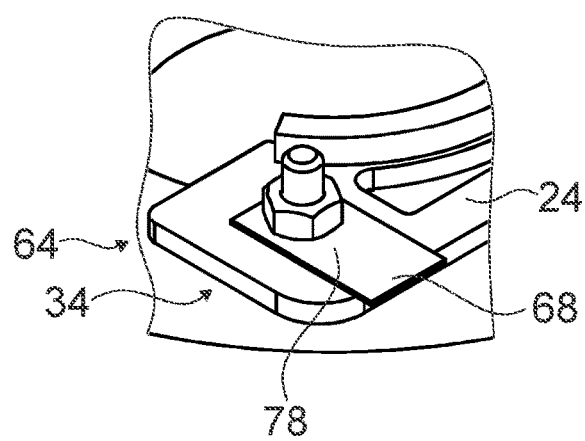
FIG. 4 shows part of the stirring device having a securing unit in various states.
Figure 4B:
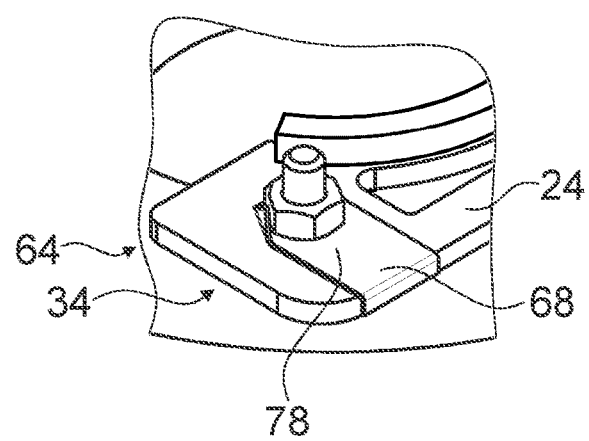

The holding unit 18 has at least one carrier unit 20 (cf. FIG. 3). The carrier unit 20 is configured for at least partially receiving a weight force and/or a transverse force of the brittle unit 12, in particular of the radiation unit 50. The carrier unit 20 is composed of a corrosion-resistant material, such as, for example, a metal, preferably titanium. The carrier unit 20 is connected to the container wall 16 in at least one mounted state. In the present case, the carrier unit 20 is connected to the container wall 16 in an integrally bonded manner, specifically is preferably welded thereto. Alternatively or additionally, the carrier unit 20 can be connected, in particular by means of at least one foot 62, to the container wall 16 in a force-fit and/or form-fit manner.

For the connection of the carrier unit 20 to the container wall 16, the carrier unit 20 has the at least one foot 62. In the present case, the carrier unit 20 has two feet 62. In particular for improving a connection to the container wall 16, the carrier unit 20 can have a number of feet 62 differing from that shown here.

The carrier unit 20 has a base body 54. The foot 62 is connected integrally to the base body 54. The carrier unit 20 has the receiving recess 58. The receiving recess 58 is arranged in the region of the base body 54. The receiving recess 58 is configured at least for receiving the brittle unit 12, in particular the radiation unit 50.

The holding unit 18 has at least one connection unit 22. The connection unit 22 is configured for at least partially engaging around at least the brittle unit 12, in particular the radiation unit 50, in the circumferential direction. The connection unit 22 connects at least the brittle unit 12, in particular the radiation unit 50, to the container wall 16.

The connection unit 22 is supported movably relative to the carrier unit 20 in at least one preassembled state. The connection unit 22 has at least one guide element 24. The guide element 24 is configured for the movable mounting of the connection unit 22 relative to the carrier unit 20. The guide element 24 is composed of a corrosion-resistant material, such as, for example, a metal, preferably titanium. In the present case, the connection unit 22 has two guide elements 24, 25. The guide elements 24, 25 are embodied identically to each other. The guide elements 24, 25 are arranged mutually opposite relative to a main extent of the brittle unit 12.

In a preferred implementation of the invention, it is proposed that the connection unit 22 has at least one further guide element 26. The further guide element 26 is arranged opposite the guide element 25 relative to the carrier unit 20. The carrier unit 20 is clamped between the guide element 24 and the further guide element 26 in the direction of the main extent of the container wall 16 in at least one mounted state. In the present case, the connection unit 22 has two further guide elements 26, 27. The further guide elements 26, 27 are embodied identically to each other. The further guide elements 26, 27 are arranged mutually opposite relative to the main extent of the brittle unit 12.

The connection unit 22 has at least one contact element 28. In the present case, the connection unit 22 has at least two contact elements 28. The contact elements 28 are arranged mutually opposite relative to the main extent of the brittle unit 12. The contact element 28 is configured to provide at least one contact surface 30 at least for making contact with the brittle unit 12, in particular with the radiation unit 50. The contact surface 30 has a shape at least substantially adapted to at least one surface 32 of the brittle unit 12. The contact element 28 is annular. The contact element 28 is designed as a jaw. The contact element 28 is configured to realize a frictional connection with the brittle unit 12. The contact element 28 is at least partially composed of a synthetic material, in particular an acid-resistant plastic, which is preferably also resistant in relation to aggressive acids, such as, for example, aqua regia. In the present case, the contact element 28 is composed of polytetrafluoroethylene (PTFE), in particular also known under the tradename Teflon. The guide element 24 is connected to the contact element 28 in a force-fit and/or form-fit manner.

The contact element 28 is clipped in the guide element 24. In the same manner, the further guide element 26 is connected to the contact element 28.

The connection unit 22 is fixedly connected to the carrier unit 20 in at least one mounted state. The stirring device has a connecting unit 64. The connecting unit 64 is configured for connecting the connection unit 22 to the carrier unit 20. The connecting unit 64 is configured for connecting the connection unit 22 to the carrier unit 20 in a force-fit and/or form-fit manner. The carrier unit 20 is clamped between the connection unit 22, in particular on both sides, by means of the connecting unit 64. The base body 54 of the carrier unit 20 is clamped between the guide element 24 and the further guide element 26 by means of the connecting unit 64. Furthermore, the base body 54 of the carrier unit 20 is clamped between the guide element 25 and the further guide element 27 by means of the connecting unit 64.

The connecting unit 64 is designed as a screw connection. The connecting unit 64 has at least one first connecting element 66. In the present case, the connecting unit 64 has four such connecting elements 66. For better clarity, only one connecting element 66 is provided with a reference sign in the drawings. The connecting elements 66 are embodied identically with one another. The connecting element 66 is designed as a screw.

Furthermore, the connecting unit 64 comprises at least one connecting element 68 corresponding to the connecting element 66. In the present case, the connecting unit 64 has four such corresponding connecting elements 68. For better clarity, only one corresponding connecting element 68 is provided with a reference sign in the drawings. The corresponding connecting elements 68 are embodied identically to one another. The corresponding connecting element 68 is designed as a nut.

The connecting unit 64 comprises a connection recess 70. The carrier unit 20 has the connection recess 70 in the region of the base body 54. The connection recess 70 is connected to the receiving recess 58. The connection recess 70 is designed as an elongate hole. Furthermore, the connecting unit 64 comprises a further connection recess 72. The further connection recess 72 is arranged opposite the connection recess 70 relative to the main extent of the brittle unit 12. The further connection recess 72 is implemented identically to the connection recess 70.

The connecting unit 64 comprises at least one guide recess 74. The guide recess 74 is designed as a recess of the guide element 24. In the present case, the connecting unit 64 comprises one guide recess 74 per connecting element 66 or corresponding connecting element 68. Furthermore, in the present case, each guide element 24, 25 has two guide recesses 74.

The connecting unit 64 comprises at least one further guide recess 76. The guide recess 76 is designed as a recess of the further guide element 26. In the present case, the connecting unit 64 comprises one further guide recess 76 per connecting element 66 or corresponding connecting element 68. Furthermore, in the present case, each further guide element 26, 27 has two further guide recesses 76.

For connection of the connection unit 22 to the carrier unit 20, the guide element 26 is guided by the further guide recess 76, the connection recess 70 and the guide recess 74 and is connected to the corresponding connecting element 68.

The holding unit 18 has at least one securing unit 34. The securing unit 34 secures the connection of the carrier unit 20 to the connection unit 22 in the mounted state. The securing unit 34 locks the connecting unit 64 in a position in which the latter connects the connection unit 22 to the carrier unit 20.

The securing unit 34 comprises at least one securing element 78. In the present case, the securing unit 34 has two securing elements 78 per guide element 24, 25, 26, 27. The securing element 78 is configured for a release of the connection of the carrier unit 20 and of the connection unit 22 by means of a form-fit connection. The securing element 78 is designed as a bending part. When the connection unit 22 is connected to the carrier unit 20, the securing element 78 can be clamped and in particular can be bent at least once without being destroyed, in order to establish a form-fit connection. The securing element 78 can be adapted to a shape of the connection unit 22, in particular of the guide element 24, 25, 26, 27. In particular, the securing element 78 can be adapted to an edge of the guide element 24, 25, 26, 27. The securing element 78 can be adapted to the connecting element 66 and/or to the corresponding connecting element 68. In particular, the securing element 78 can be adapted to an edge of the connecting element 66 and/or of the corresponding connecting element 68.

REFERENCE SIGNS

10 Holder
12 Brittle unit
14 Container
16 Container wall
18 Holding unit
20 Carrier unit
22 Connection unit
24 Guide element
25 Guide element
26 Further guide element
27 Further guide element
28 Contact element
30 Contact surface
32 Surface
34 Securing unit
36 Further holding unit
37 Further holding unit 38 Stirring vessel
40 Bottom
42 Cover
44 Opening
46 Stirring agitator
48 Stirring element
50 Radiation unit
52 Radiation source
54 Base body
56 Medium
58 Receiving recess
60 Shaft
62 Foot
64 Connecting unit
66 Connecting element
68 Corresponding connecting element
70 Connection recess
72 Further connection recess
74 Guide recess
76 Further guide recess
78 Securing element

The invention claimed is:

1. A stirring device having a holder which is configured for holding a brittle unit within a container relative to a container wall of the container, comprising
a holding unit for this purpose,
wherein at least one holding position of the holder relative to the container wall can be adapted by means of the holding unit,
wherein the holding unit has a carrier unit, which is configured for at least partially receiving a weight force and/or a transverse force of the brittle unit, and which is connected in at least one mounted state to the container wall,
wherein the holding unit has a connection unit, which is configured for at least partially engaging around the brittle unit in a circumferential direction and for connecting the brittle unit to the container wall,
wherein the connection unit has a guide element for movably supporting the connection unit relative to the carrier unit, and
wherein the connection unit has a further guide element and the carrier unit is in at least one mounted state clamped between the guide element and the further guide element.

2. The stirring device as claimed in claim 1, wherein the connection unit is supported movably relative to the carrier unit in at least one preassembled state.

3. The stirring device as claimed in claim 1, wherein the connection unit has a contact element, which is configured to provide a contact surface for making contact with the brittle unit.

4. The stirring device as claimed in claim 3, wherein the contact surface has a shape at least substantially adapted to at least one surface of the brittle unit.

5. The stirring device as claimed in claim 3, wherein the guide element is connected to the contact element at least in a form-fit manner.

6. The stirring device as claimed in claim 5, wherein the contact element is clipped in the guide element.

7. The stirring device as claimed in claim 1, wherein the connection unit is fixedly connected to the carrier unit in at least one mounted state.

8. The stirring device as claimed in claim 7, wherein the holding unit has at least one securing unit, which secures the connection of the carrier unit to the connection unit in the mounted state.

9. The stirring device as claimed in claim 1, wherein the brittle unit which is at least partially composed of glass.

10. The stirring device as claimed in claim 1, wherein the holder has at least one further holding unit, which is arranged offset with respect to the holding unit as viewed along the container wall.

11. A method for mounting a brittle unit within a container by means of a holder with a stirring device as claimed in claim 1, comprising
compensating tolerances by means of at least one holding unit of the holder.

* * * * *